United States Patent Office.

GEORGE BIRTWISTLE AND ROBERT BIRTWISTLE, OF FALL RIVER, MASSACHUSETTS.

Letters Patent No. 74,288, dated February 11, 1868.

IMPROVED GREASE OR SIZING.

*The Schedule referred to in these Letters Patent and making part of the same.*

TO ALL WHOM IT MAY CONCERN:

Be it known that we, GEORGE BIRTWISTLE and ROBERT BIRTWISTLE, of Fall River, in the county of Bristol, and State of Massachusetts, have invented a new composition of matter, called Sizing-Grease or Composition, for the purpose of sizing cotton-warp and making it soft and pliable, thus enabling it to be worked more evenly; and we hereby declare that the following is an exact and full statement of the quantity and proportions of each article or ingredient composing said composition or grease, and that it is compounded as follows:

To eighteen quarts of water add three (3) pounds and (10) ten ounces of white soap, and two (2) quarts and one pint of soda-ash, (at 18 T.) Boil the whole thirty (30) minutes. Then, to every one hundred pounds of starch, add four pounds of sizing-grease or composition above described.

What we claim as our invention, and desire to secure by Letters Patent, is—

1. The combination of soap and soda-ash, in the proportions above described, for the purposes named.
2. The use of soap alone, as an agent, when applied to any starch or sizing, for the purposes above described.

GEORGE BIRTWISTLE,
ROBERT BIRTWISTLE.

Witnesses:
  B. F. WINSLOW,
  GEORGE A. HICKS,
  R. M. WINSLOW.